(12) United States Patent
Scott et al.

(10) Patent No.: US 9,903,224 B2
(45) Date of Patent: Feb. 27, 2018

(54) SCUPPER CHANNELLING IN GAS TURBINE MODULES

(71) Applicant: United Technologies Corporation, Hartford, CT (US)

(72) Inventors: Jonathan Ariel Scott, Southington, CT (US); Larry B. Hawke, Hobe Sound, FL (US)

(73) Assignee: United Technologies Corporation, Farmington, CT (US)

( * ) Notice: Subject to any disclaimer, the term of this patent is extended or adjusted under 35 U.S.C. 154(b) by 308 days.

(21) Appl. No.: 14/655,644

(22) PCT Filed: Dec. 18, 2013

(86) PCT No.: PCT/US2013/076179
§ 371 (c)(1),
(2) Date: Jun. 25, 2015

(87) PCT Pub. No.: WO2014/105577
PCT Pub. Date: Jul. 3, 2014

(65) Prior Publication Data
US 2015/0337681 A1  Nov. 26, 2015

Related U.S. Application Data

(60) Provisional application No. 61/747,282, filed on Dec. 29, 2012.

(51) Int. Cl.
*F01D 25/12* (2006.01)
*F01D 25/30* (2006.01)
(Continued)

(52) U.S. Cl.
CPC ........... *F01D 25/125* (2013.01); *F01D 9/065* (2013.01); *F01D 25/162* (2013.01); *F01D 25/24* (2013.01);
(Continued)

(58) Field of Classification Search
CPC ...... F01D 25/125; F01D 9/065; F01D 25/162; F01D 25/24; F01D 25/30; F02C 7/12;
(Continued)

(56) References Cited

U.S. PATENT DOCUMENTS

| 2,214,108 A | 7/1938 | Grece |
| 3,576,328 A | 4/1971 | Vase |

(Continued)

FOREIGN PATENT DOCUMENTS

| WO | WO 03/020469 A1 | 3/2003 |
| WO | WO 2006/007686 A1 | 1/2006 |

(Continued)

OTHER PUBLICATIONS

International Search Report dated Apr. 15, 2014 for corresponding PCT Application No. PCT/US2013/076179.

*Primary Examiner* — Logan Kraft
*Assistant Examiner* — Peter T Hrubiec
(74) *Attorney, Agent, or Firm* — Kinney & Lange, P.A.

(57) ABSTRACT

A gas turbine module comprises a frame, a bearing support ring, a service line, and a scupper channel system. A service line is disposed through a radial passage of the frame and a service line port of the bearing support ring. The scupper line is disposed radially through a radial passage of the frame and is open to the scupper drain port. The scupper channel system is formed into a radially inner surface of the bearing support ring, and includes a collection portion in fluid communication with the scupper drain port.

21 Claims, 6 Drawing Sheets

(51) Int. Cl.
- *F01D 25/24* (2006.01)
- *F01D 25/16* (2006.01)
- *F01D 9/06* (2006.01)
- *F02C 7/20* (2006.01)
- *F02C 7/12* (2006.01)

(52) U.S. Cl.
CPC .............. *F01D 25/30* (2013.01); *F02C 7/12* (2013.01); *F02C 7/20* (2013.01); F05D 2220/32 (2013.01); F05D 2260/20 (2013.01); Y02T 50/675 (2013.01)

(58) Field of Classification Search
CPC .... F02C 7/20; F05D 2220/32; F05D 2260/20; Y02T 50/675
See application file for complete search history.

(56) References Cited

U.S. PATENT DOCUMENTS

| | | | |
|---|---|---|---|
| 3,612,577 A * | | 10/1971 | Pope .................. F16L 9/18 285/123.1 |
| 3,802,046 A | | 4/1974 | Wachtell et al. |
| 3,970,319 A | | 7/1976 | Carroll et al. |
| 4,009,569 A | | 3/1977 | Kozlin |
| 4,044,555 A | | 4/1977 | McLoughlin et al. |
| 4,088,422 A | | 5/1978 | Martin |
| 4,114,248 A | | 9/1978 | Smith et al. |
| 4,305,697 A | | 12/1981 | Cohen et al. |
| 4,321,007 A | | 3/1982 | Dennison et al. |
| 4,369,016 A | | 1/1983 | Dennison |
| 4,478,551 A | | 10/1984 | Honeycutt, Jr. et al. |
| 4,645,217 A | | 2/1987 | Honeycutt, Jr. et al. |
| 4,678,113 A | | 7/1987 | Bridges et al. |
| 4,738,453 A | | 4/1988 | Ide |
| 4,756,536 A | | 7/1988 | Belcher |
| 4,793,770 A | | 12/1988 | Schonewald et al. |
| 4,920,742 A | | 5/1990 | Nash et al. |
| 4,987,736 A | | 1/1991 | Ciokajlo et al. |
| 4,989,406 A | | 2/1991 | Vdoviak et al. |
| 4,993,918 A | | 2/1991 | Myers et al. |
| 5,031,922 A | | 7/1991 | Heydrich |
| 5,042,823 A | | 8/1991 | Mackay et al. |
| 5,071,138 A | | 12/1991 | Mackay et al. |
| 5,076,049 A | | 12/1991 | VonBenken et al. |
| 5,100,158 A | | 3/1992 | Gardner |
| 5,108,116 A | | 4/1992 | Johnson et al. |
| 5,169,159 A | | 12/1992 | Pope et al. |
| 5,174,584 A | | 12/1992 | Lahrman |
| 5,188,507 A | | 2/1993 | Sweeney |
| 5,211,541 A | | 5/1993 | Fledderjohn et al. |
| 5,236,302 A | | 8/1993 | Weisgerber et al. |
| 5,246,295 A | | 9/1993 | Ide |
| 5,265,807 A | | 11/1993 | Steckbeck et al. |
| 5,269,057 A | | 12/1993 | Mendham |
| 5,272,869 A | | 12/1993 | Dawson et al. |
| 5,273,397 A | | 12/1993 | Czachor et al. |
| 5,292,227 A | | 3/1994 | Czachor et al. |
| 5,312,227 A | | 5/1994 | Grateau et al. |
| 5,338,154 A | | 8/1994 | Meade et al. |
| 5,357,744 A | | 10/1994 | Czachor et al. |
| 5,370,402 A | | 12/1994 | Gardner et al. |
| 5,385,409 A | | 1/1995 | Ide |
| 5,401,036 A | | 3/1995 | Basu |
| 5,438,756 A | | 8/1995 | Halchak et al. |
| 5,474,305 A | | 12/1995 | Flower |
| 5,483,792 A | | 1/1996 | Czachor et al. |
| 5,558,341 A | | 9/1996 | McNickle et al. |
| 5,597,286 A | | 1/1997 | Dawson et al. |
| 5,605,438 A | | 2/1997 | Burdgick et al. |
| 5,609,467 A | | 3/1997 | Lenhart et al. |
| 5,632,493 A | | 5/1997 | Gardner |
| 5,634,767 A | | 6/1997 | Dawson |
| 5,691,279 A | | 11/1997 | Tauber et al. |
| 5,755,445 A | | 5/1998 | Arora |
| 5,851,105 A | | 12/1998 | Fric et al. |
| 5,911,400 A | | 6/1999 | Niethammer et al. |
| 6,163,959 A | | 12/2000 | Arraitz et al. |
| 6,196,550 B1 | | 3/2001 | Arora et al. |
| 6,227,800 B1 | | 5/2001 | Spring et al. |
| 6,337,751 B1 | | 1/2002 | Kimizuka |
| 6,343,912 B1 | | 2/2002 | Mangeiga et al. |
| 6,358,001 B1 | | 3/2002 | Bosel et al. |
| 6,364,316 B1 | | 4/2002 | Arora |
| 6,439,841 B1 | | 8/2002 | Bosel |
| 6,511,284 B2 | | 1/2003 | Darnell et al. |
| 6,578,363 B2 | | 6/2003 | Hashimoto et al. |
| 6,601,853 B2 | | 8/2003 | Inoue |
| 6,612,807 B2 | | 9/2003 | Czachor |
| 6,619,030 B1 | | 9/2003 | Seda et al. |
| 6,638,013 B2 | | 10/2003 | Nguyen et al. |
| 6,652,229 B2 | | 11/2003 | Lu |
| 6,672,833 B2 | | 1/2004 | MacLean et al. |
| 6,719,524 B2 | | 4/2004 | Nguyen et al. |
| 6,736,401 B2 | | 5/2004 | Chung et al. |
| 6,792,758 B2 | | 9/2004 | Dowman |
| 6,796,765 B2 | | 9/2004 | Kosel et al. |
| 6,805,356 B2 | | 10/2004 | Inoue |
| 6,811,154 B2 | | 11/2004 | Proctor et al. |
| 6,935,631 B2 | | 8/2005 | Inoue |
| 6,969,826 B2 | | 11/2005 | Trewiler et al. |
| 6,983,608 B2 | | 1/2006 | Allen, Jr. et al. |
| 7,055,305 B2 | | 6/2006 | Baxter et al. |
| 7,094,026 B2 | | 8/2006 | Coign et al. |
| 7,100,358 B2 | | 9/2006 | Gekht et al. |
| 7,200,933 B2 | | 4/2007 | Lundgren et al. |
| 7,229,249 B2 | | 6/2007 | Durocher et al. |
| 7,238,008 B2 | | 7/2007 | Bobo et al. |
| 7,367,567 B2 | | 5/2008 | Farah et al. |
| 7,371,044 B2 | | 5/2008 | Nereim |
| 7,389,583 B2 | | 6/2008 | Lundgren |
| 7,614,150 B2 | | 11/2009 | Lundgren |
| 7,631,879 B2 | | 12/2009 | Diantonio |
| 7,673,461 B2 | | 3/2010 | Cameriano et al. |
| 7,677,047 B2 | | 3/2010 | Somanath et al. |
| 7,735,833 B2 | | 6/2010 | Braun et al. |
| 7,798,768 B2 | | 9/2010 | Strain et al. |
| 7,815,417 B2 | | 10/2010 | Somanath et al. |
| 7,824,152 B2 | | 11/2010 | Morrison |
| 7,891,165 B2 | | 2/2011 | Bader et al. |
| 7,909,573 B2 | | 3/2011 | Cameriano et al. |
| 7,955,446 B2 | | 6/2011 | Dierberger |
| 7,959,409 B2 | | 6/2011 | Guo et al. |
| 7,988,799 B2 | | 8/2011 | Dierberger |
| 8,069,648 B2 | | 12/2011 | Snyder et al. |
| 8,083,465 B2 | | 12/2011 | Herbst et al. |
| 8,091,371 B2 | | 1/2012 | Durocher et al. |
| 8,092,161 B2 | | 1/2012 | Cai et al. |
| 8,152,451 B2 | | 4/2012 | Manteiga et al. |
| 8,162,593 B2 | | 4/2012 | Guimbard et al. |
| 8,172,526 B2 | | 5/2012 | Lescure et al. |
| 8,177,488 B2 | | 5/2012 | Manteiga et al. |
| 8,221,071 B2 | | 7/2012 | Wojno et al. |
| 8,245,399 B2 | | 8/2012 | Anantharaman et al. |
| 8,245,518 B2 | | 8/2012 | Durocher et al. |
| 8,282,342 B2 | | 10/2012 | Tonks et al. |
| 8,371,127 B2 | | 2/2013 | Durocher et al. |
| 8,371,812 B2 | | 2/2013 | Manteiga et al. |
| 2003/0025274 A1 | | 2/2003 | Allan et al. |
| 2003/0042682 A1 | | 3/2003 | Inoue |
| 2003/0062684 A1 | | 4/2003 | Inoue |
| 2003/0062685 A1 | | 4/2003 | Inoue |
| 2005/0046113 A1 | | 3/2005 | Inoue |
| 2006/0010852 A1 | | 1/2006 | Gekht et al. |
| 2008/0107522 A1 | | 5/2008 | Dibenedetto |
| 2008/0216300 A1 | | 9/2008 | Anderson et al. |
| 2010/0132371 A1 | | 6/2010 | Durocher et al. |
| 2010/0132374 A1 | | 6/2010 | Manteiga et al. |
| 2010/0132377 A1 | | 6/2010 | Durocher et al. |
| 2010/0135770 A1 | | 6/2010 | Durocher et al. |
| 2010/0202872 A1 | | 8/2010 | Weidmann |
| 2010/0236244 A1 | | 9/2010 | Longardner |
| 2010/0275572 A1 | | 11/2010 | Durocher et al. |
| 2010/0275614 A1 | | 11/2010 | Fontaine et al. |

(56) References Cited

U.S. PATENT DOCUMENTS

| | | |
|---|---|---|
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0061767 A1 | 3/2011 | Vontell et al. |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0023896 A1 | 2/2012 | Dede et al. |
| 2012/0088624 A1 | 4/2012 | Sheridan |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| WO | WO 2009/157817 A1 | 12/2009 |
| WO | WO 2010/002295 A1 | 1/2010 |
| WO | WO 2012/158070 A1 | 11/2012 |

* cited by examiner

SCUPPER CHANNELLING IN GAS TURBINE MODULES

BACKGROUND

The described subject matter relates generally to gas turbine engines and more specifically to bearing supports for gas turbine engines.

A turbine exhaust case (TEC) for a gas turbine engine includes a number of structural components as well as various hot working fluid flow paths and coolant flow paths. The coolant provides temperature control of structural components exposed to the hot working fluid to maintain integrity and efficiency of the engine.

Oil systems for gas turbine engines inevitably experience a small degree of leakage and weeping around component interfaces, seals, and the like. Schemes have been developed to collect and channel these and other liquids away from critical parts of the engine where risk of fire and explosions are increased.

SUMMARY

A gas turbine module comprises a frame, a bearing support ring, a service line, and a scupper line. The bearing support ring is mounted to the frame radially inward of the frame inner hub, and includes a scupper drain port and a service line port disposed proximate to the scupper drain port. A service line is disposed through a radial passage of the frame and the service line port of the bearing support ring. The scupper line is disposed radially through the radial passage of the frame and is open to the scupper drain port. The scupper channel system is formed into a radially inner surface of the bearing support ring, the scupper channel system including a collection portion in fluid communication with the scupper drain port.

A turbine exhaust case assembly comprises a frame, a bearing support ring, and a scupper channel system. The bearing support ring is mounted to a frame inner hub and includes a scupper drain port circumferentially aligned with a passage extending radially through a frame strut. The scupper channel system is formed into a radially inner surface of the bearing support ring, and includes a liquid collection portion in fluid communication with the scupper drain port.

DETAILED DESCRIPTION

Figure 1:
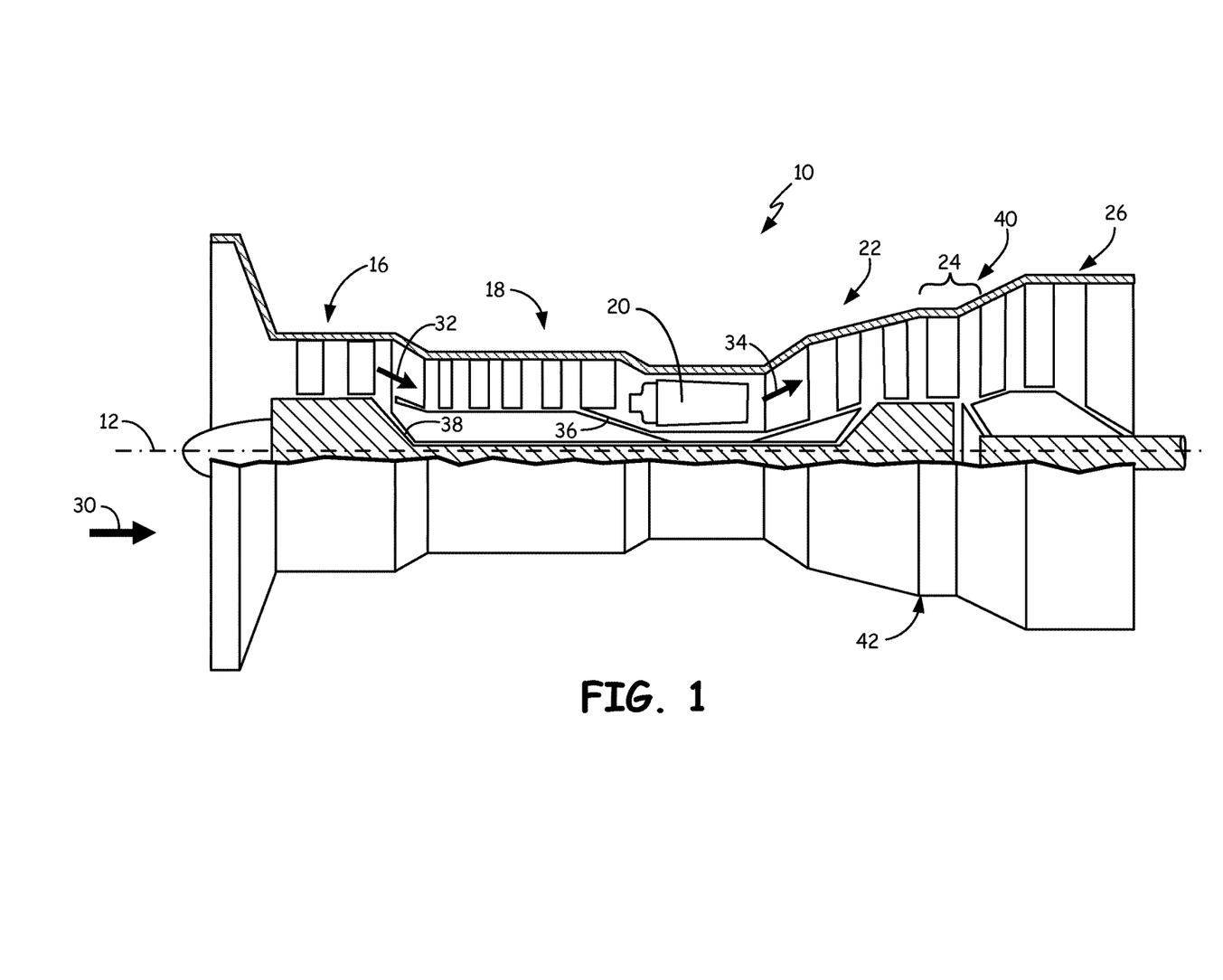
FIG. 1 schematically depicts an example gas turbine engine.

FIG. 1 includes gas turbine engine 10, centerline axis 12, low pressure compressor section 16, high pressure compressor section 18, combustor section 20, high pressure turbine section 22, low pressure turbine section 24, free turbine section 26, incoming ambient air 30, pressurized air 32, combustion gases 34, high pressure rotor shaft 36, low pressure rotor shaft 38, and turbine exhaust case assembly 40.

FIG. 1 shows gas turbine engine 10, which is configured as an industrial gas turbine engine in the illustrated embodiment. Engine 10 is circumferentially disposed about a central, longitudinal axis, or engine centerline axis 12, and includes in series order, low pressure compressor section 16, high pressure compressor section 18, combustor section 20, high pressure turbine section 22, and low pressure turbine section 24. In some examples, a free turbine section 26 is disposed aft of the low pressure turbine 24. Free turbine section 26 is often described as a "power turbine" and can rotationally drive one or more generators, centrifugal pumps, or other apparatuses (not shown).

As is well known in the art of gas turbines, incoming ambient air 30 becomes pressurized air 32 in compressors 16, 18. Fuel mixes with pressurized air 32 in combustor section 20, where it is burned. Once burned, combustion gases 34 expand through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown). Turbine exhaust case (TEC) assembly 40 is also shown in FIG. 1, disposed axially between low pressure turbine section 24 and power turbine 26. TEC assembly 40 is described in more detail below.

FIG. 1 provides a basic understanding and overview of the various sections and the basic operation of an industrial gas turbine engine. Although illustrated with reference to an industrial gas turbine engine, the described subject matter also extends to aero engines having a fan with or without a fan speed reduction gearbox, as well as those engines with more or fewer sections than illustrated such as an intermediate pressure spool. It will become apparent to those skilled in the art that the present application is applicable to all types of gas turbine engines, including those in aerospace applications. For example, while the subject matter is described with respect to a TEC assembly for an industrial gas turbine engine, the teachings can be readily adapted to other applications, such as but not limited to a mid-turbine frame and/or turbine exhaust case for an aircraft engine.

Figure 2:
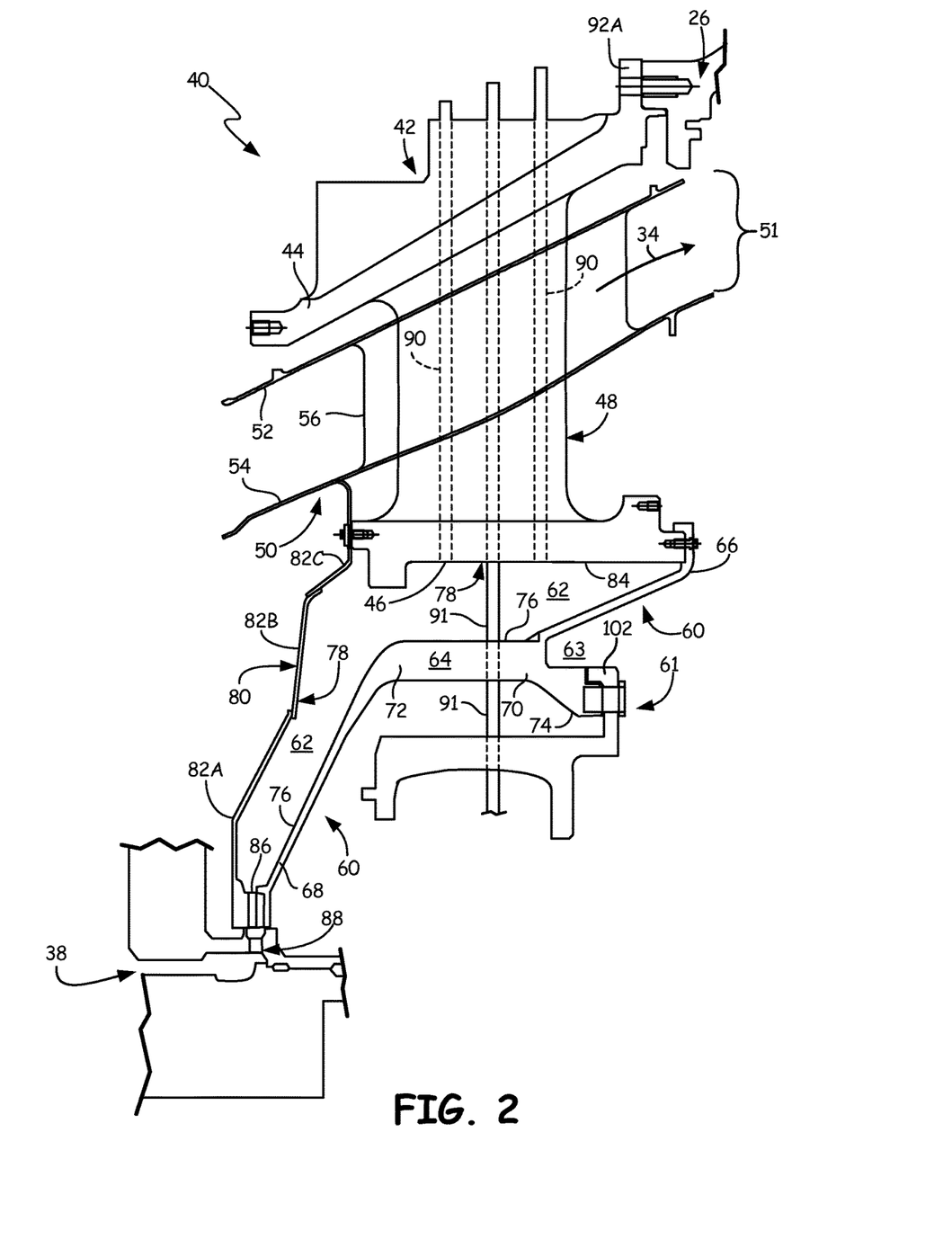
FIG. 2 is a detailed cross-section of a turbine module.

FIG. 2 shows first gas turbine engine module 40, and also shows combustion gases 34, engine shaft 38, frame 42, frame outer case 44, frame inner hub 46, frame strut 48, fairings assembly 50, main engine gas flow path 51, outer platform 52, inner platform 54, liners 56, combination bearing support element 60, bearing compartment 61, flow divider cavity 62, annular gap 63, bearing support ring section 64, frame mounting ring 66, first flow divider ring section 68, bearing support ring section aft end 70, bearing support ring section forward end 72, bearing compartment mounting flange 74, radially inner cavity wall 76, outer cavity wall 78, second flow divider ring 80, metal ring segments 82A, 82B, 82C, TEC frame inner surface 84, inner cooling air ports 86, shaft outlet apertures 88, strut radial passages 90, and service line 91.

As described above, this illustrative example will be described with reference to TEC assembly 40, but the described subject matter can be readily adapted for several other gas turbine applications. As seen in FIG. 2, first module 40 includes frame 42 with outer case 44, inner hub 46, with a plurality of circumferentially distributed struts 48 (only one shown in FIG. 2) extending radially between outer case 44 and inner hub 46. Fairing assembly 50 extends generally axially through frame 42 to define main gas flow path 51 for working/combustion gases 34. In this example, fairing assembly 50 includes outer fairing platform 52, inner fairing platform 54, and strut liners 56. TEC assembly 40 may optionally be connected to a downstream module such as a power turbine. The downstream module (e.g., power turbine 26 shown in FIG. 1) can include other components such as a stator vane and rotor blade (not shown in FIG. 2), which are disposed downstream of frame 42 and fairing assembly 50 with respect to the flow direction of working/combustion gases 34.

In the embodiment shown, fairing assembly 50 is affixed to frame 42 and can be adapted to have outer fairing platform 52 disposed radially inward of outer case 44 while inner fairing platform 54 may be disposed radially outward of inner frame hub 46. Strut liners 56 can also be adapted to be disposed around frame struts 48. When assembled, outer fairing platform 52, inner fairing platform 54, and fairing strut liners 56 define a portion of main gas flow path 51 for combustion gases 34 to pass through TEC assembly 40 during engine operation. Main gas flow path 51 can also be sealed (not shown) between gas turbine modules, and around the edges of fairing assembly 50, to reduce unwanted leakage and heating of frame 42.

TEC assembly 40 also includes combination bearing support element 60 which can be a single unitary and monolithic piece operable to secure and transmit loads between TEC frame 42 and bearing compartment 61. Bearing compartment 61 contains a bearing assembly (not shown) to support rotation of shaft 38 about engine centerline 12. Flow divider cavity 62 is disposed in annular gap 63 between bearing compartment 61 and TEC frame 42. Flow divider cavity 62 helps collect, manage, and direct coolant to help maintain desired operating temperatures in, around, and through TEC frame 42. First flow divider ring section 68 can be integral with bearing support ring section 64, such as by joining or forming those parts together using welding, (or other metallurgical joining), as well as by forging, and/or casting. In certain embodiments, combination bearing support element 60 is machined from a single unitary casting.

Combination bearing support element 60 can be mounted to frame 42 radially inward of frame inner hub 46. Combination bearing support element 60 can include bearing support ring section 64, frame mounting ring 66, first flow divider ring section 68, bearing compartment mounting ring 74. Frame mounting ring 66 can be disposed at or near an aft end of bearing support ring section 64, and first flow divider ring section 68 can be contiguous with forward end 72 of bearing support ring section 64. Together, one or more of these sections of bearing support element 60 can define a contiguous, radially inner wall 76 of flow divider cavity 62.

In this example, combination bearing support element 60 also includes bearing compartment mounting ring 74 with a circumferential flange for securing bearing compartment 61 thereto. Mounting ring 74 may be disposed on bearing support ring aft end 70 to support bearing compartment 61 radially inward of bearing support ring section 64. Frame mounting ring 66 is disposed on a radially outer side of bearing support ring aft end 70 for securing bearing support ring 64 and bearing compartment 61 to TEC frame inner hub 46. Frame mounting ring 66 receives bearing loads from bearing support ring section 64 and transfers them to frame 42 via inner hub 46.

Cavity 62 includes radially inner cavity wall surface 76, which extends between an inner portion of engine 10 (e.g., low pressure rotor shaft 38 shown in FIG. 1) and TEC frame inner hub 46. In this example, bearing support ring section 64, first flow divider ring section 68, and frame mounting ring 66 all cooperate to define a continuous inner cavity wall 76 such that inner wall 76 of flow divider cavity 62 extends from shaft 38 to frame inner hub 46.

Outer cavity wall 78 can be defined at least in part by separate second flow divider ring assembly 80 secured axially forward of combination bearing support element 60. Second flow divider ring assembly 80 can include one or more radial ring segments 82A, 82B, 82C which can be integrally formed or mechanically interconnected, such as with a snap or interference fit. The remainder of outer flow divider cavity wall surface 78 can be defined, for example, by inner surface 84 of TEC frame inner hub 46.

In this example, inner cooling air inlet ports 86 are disposed circumferentially around inner ring segment 82A. Inlet ports 86 can be adapted to receive a volume of cooling air from corresponding outlet apertures 88 in rotating shaft 38. Inner coolant inlet ports 86 can be formed through at least one of first flow divider ring section 68 and second flow divider ring 80. Shaft outlet apertures 88 can be circumferentially distributed and radially aligned with flow divider inlet ports 86. In one example, shaft 38 provides air to flow divider cavity 62 across this static/rotational interface of flow divider inlet parts 86 and shaft outlet apertures 88. Flow divider cavity 62 may additionally and/or alternatively receive and transmit cooling air via one or more alternative locations, including but not limited to seal leakage air and/or passages extending through struts 48.

In one example, flow divider cavity 62 can be integrated into a larger cooling scheme to allow use of less expensive structural materials for TEC frame 42. Flow divider cavity 62 can be adapted to receive and direct a volume of cooling air around and through TEC assembly 40. As such, flow divider cavity 62 can include one or more openings (shown in FIG. 3) leading to radially extending passages 90 through frame strut(s) 48. TEC assembly 40 can additionally or alternatively include one or more service lines 91 extending radially through passages 90 and flow divider cavity 62.

Figure 3:
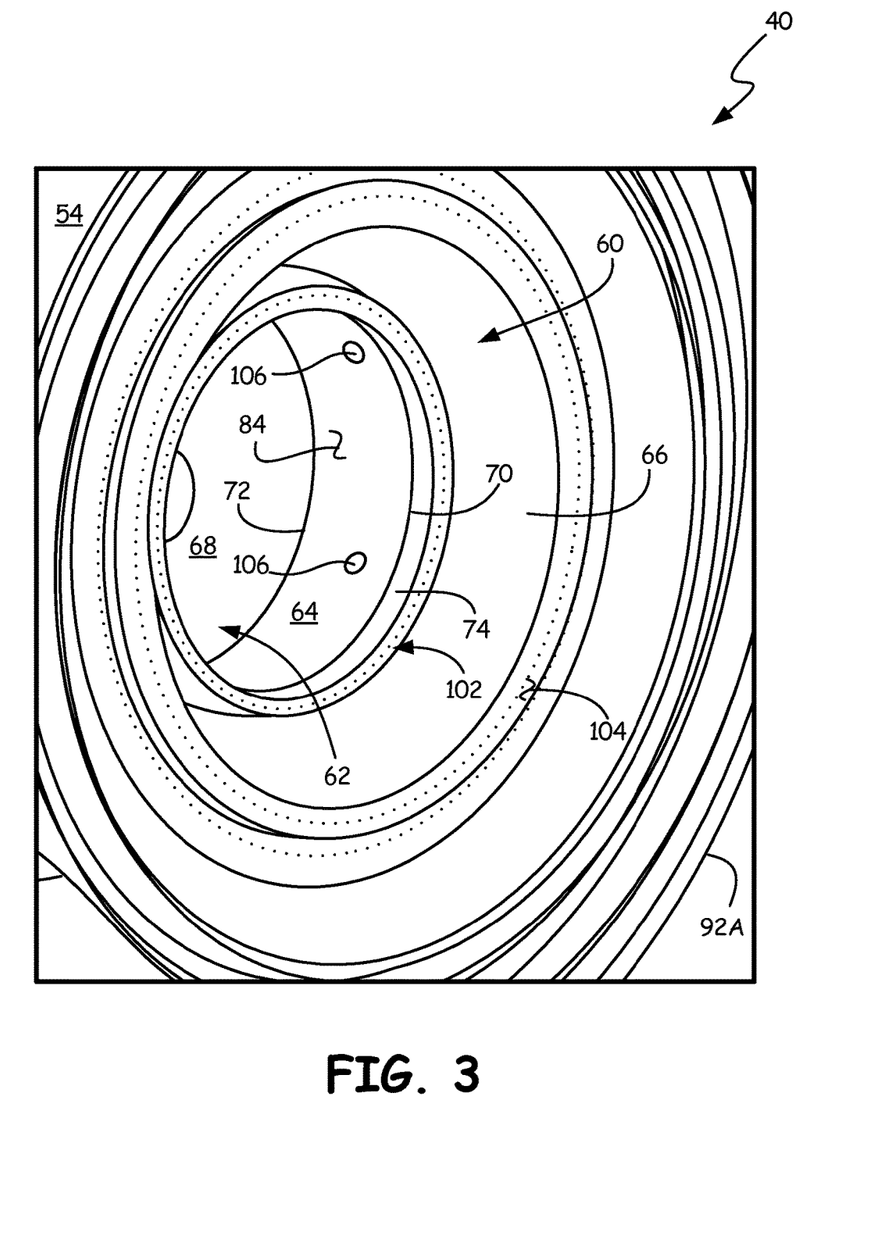
FIG. 3 is a perspective view of the aft side of the module shown in FIG. 2.

FIG. 3 shows an aft side of TEC assembly 40, and includes a combination bearing support element 60 with bearing support ring 64. FIG. 3 also includes module mounting flange 92A, bearing compartment flange mounting interface 102, frame mounting flange 104, and ports 106.

As seen in FIG. 3, combination bearing support element 60 includes bearing support ring section 64 mounted radially inward of frame inner hub 46. Frame mounting ring 66 extends around aft end 70 while first flow divider ring section 68 is contiguous with forward end 72 of bearing support ring section 64. Bearing support ring 64 includes bearing compartment flange 74 with mounting interface 102 for securing and cantilevering bearing compartment 61 as shown in FIG. 2. As seen in FIG. 3, frame mounting ring 66 can include frame mounting flange 104 facing in an opposite direction relative to mounting interface 102. Flange 104 is adapted to secure and suspend bearing support element 60 in a radially inward of frame hub 46. A plurality of openings or apertures 106 can be formed through one or more parts of bearing support element 60. Here, bearing support ring 64 includes circumferentially distributed apertures 106 to allow passage of corresponding service line 91 (shown in FIG. 2) such as oil supply tubes, cooling air supply tubes, and/or scupper lines.

Figure 4A:
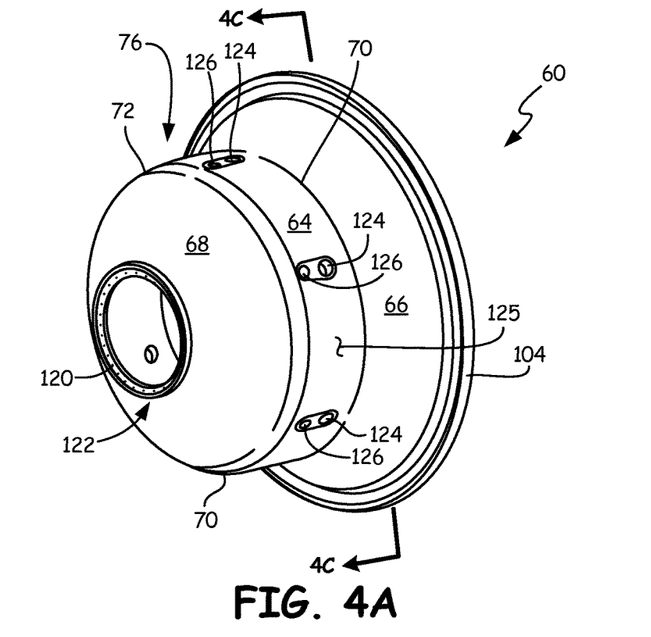
FIG. 4A is an isometric view of a forward side of an example bearing support element.
Figure 4B:
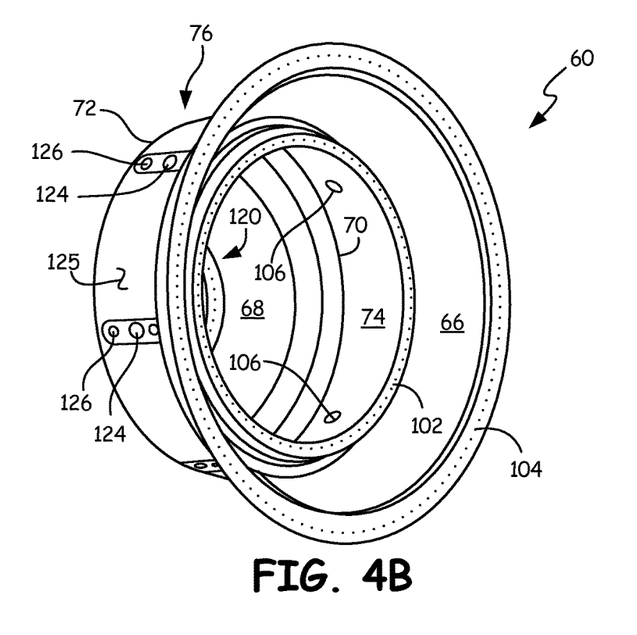
FIG. 4B is an isometric view of the aft side of the example bearing support element of FIG. 4A.
Figure 4C:
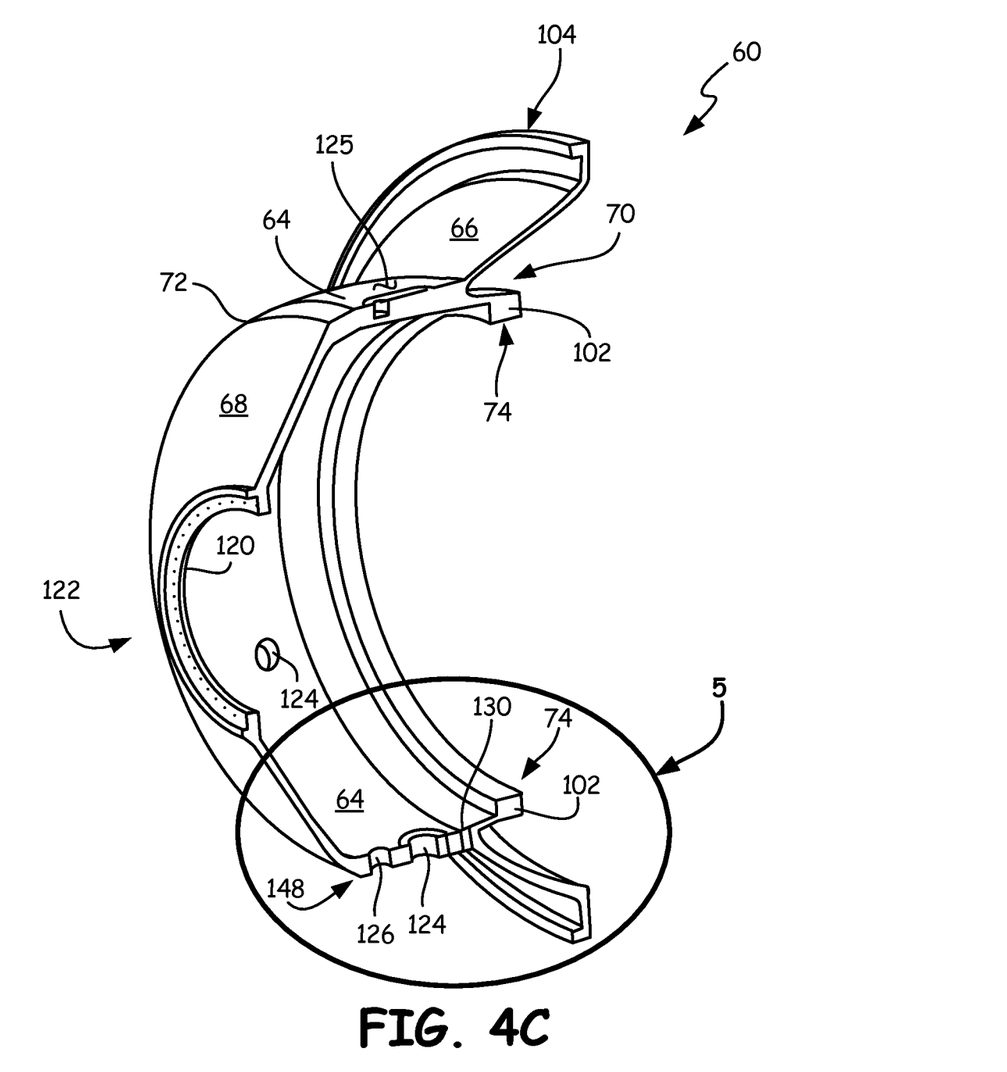
FIG. 4C shows a sectional view of the bearing support element taken through line 4C-4C of FIG. 4A.

FIG. 4A is an isometric forward view of an example combination bearing support element 60. FIG. 4B is an aft view of the example combination bearing support element 60. FIG. 4C is a cross-section of element 60 taken through line 4C-4C of FIG. 4A. FIGS. 4A-4C also include flow divider ring radially inner portion 122, bearing element ports 124, bearing element outer surface 125, and bearing element recesses 126.

Flow divider ring section 68 includes flange 120 for removably securing at least one flow divider ring component (e.g., second flow divider ring element 82A shown in FIG. 2) to radially inner portion 122. As was also shown in FIG. 2, contiguous inner wall 76 can be adapted to extend generally radially between turbine shaft 38 and frame 42.

Bearing compartment mounting flange 74 can be formed around an inner side of bearing support ring aft end 70 for securing and cantilevering bearing compartment 61 as was shown in FIG. 2. In this example, bearing compartment mounting flange 74 is formed as part of bearing support ring 64 by forging, casting, machining, or the like. It will be recognized that different configurations of frame 42 and bearing compartment 61 (shown in FIG. 2) may necessitate some modifications to the relative locations, dimensions, and orientation of combination bearing support element 60 including one or more of bearing support ring section 64, frame mounting ring 66, and first flow divider ring section 68.

Figure 5:
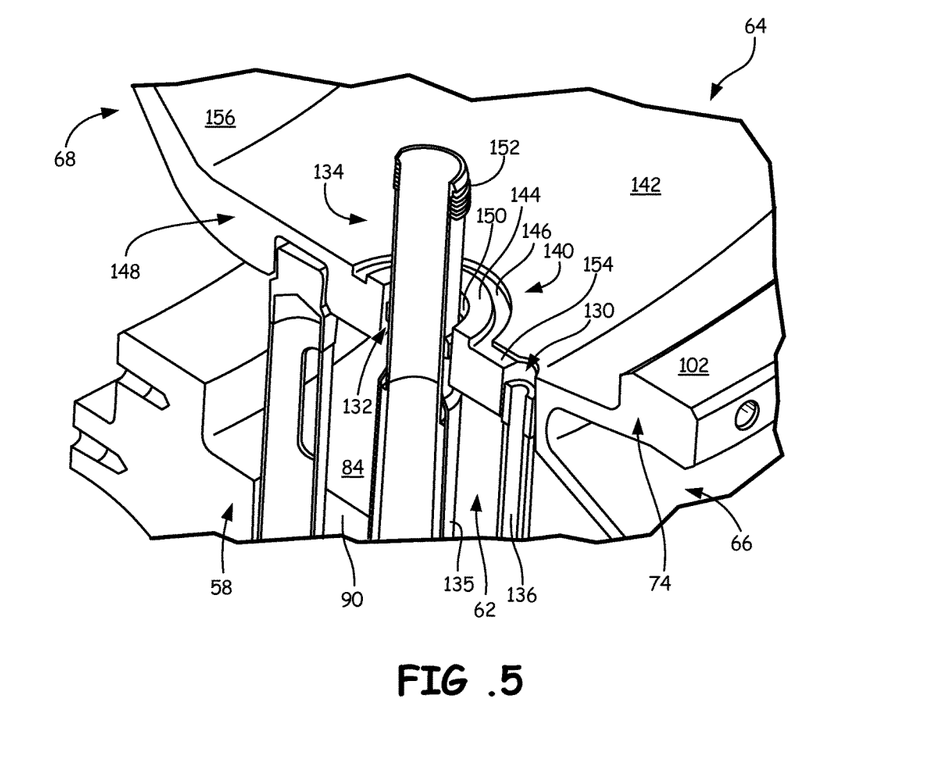
FIG. 5 is a sectional view of a turbine module showing a scupper channel system formed in a cylindrical component of the module.

FIG. 5 shows additional optional features of TEC assembly 40, located in and around bottom dead center (BDC) position 148 of bearing support ring 64 (delineated in FIG. 4C). In this view, the bottom of TEC assembly 40 is shown such that inner hub 46 is shown beneath bearing support element 60.

FIG. 5 also includes scupper drain port 130, service line port 132, service line 134, service line shroud 135, scupper line 136, scupper channel system 140 bearing support ring inner surface 142, ridge 144, collection portion 146, bottom dead center (BDC) position 148, service line gap 150, service line interface 152, and scupper trench 154.

As previously described, one or more passages 90 extend radially through frame 42 including through inner hub 46, outer case 44, and one or more struts 48. Bearing support element 60 includes bearing support ring 64 mounted to frame 42 radially inward of inner hub 46. In FIG. 5, bearing support ring 64 includes scupper drain port 130 and service line port 132 disposed proximate to scupper drain port 130. Service line 134 extends radially through frame passage 90 and through service line port 132 of bearing support ring 64. Service line 134 can also include optional shroud 135 over portions of service line 134 passing through flow divider cavity 62 and/or strut 48. Scupper line 136 can be disposed radially through flow divider cavity 62 and frame passage 90, and is also open to scupper drain port 130.

Scupper channel system 140 can be formed into radially inner surface 142 of bearing support ring 64, and includes collection portion 146 in fluid communication with scupper drain port 130. Scupper channel system 140 is adapted to capture liquids such as oil weeping out of one or more lubrication systems. In the example shown, scupper drain port 130, service line port 132, service line 134, and scupper line 136 are all located proximate a bottom dead center (BDC) position 148 of bearing support ring 64. This has the effect of maximizing liquid drainage particularly for stationary installations. However, in certain embodiments, one or more of these elements can be spaced circumferentially apart from BDC position 148.

In certain embodiments, collection portion 146 is formed into radially inner surface 142 proximate service line port 132. In the example shown, collection portion 146 is formed concentrically around service line port 132. Collection portion 146 can be spaced apart from port 132, with ridge 144 arranged annularly therebetween. Ridge 144 reduces momentum of the draining liquids, allowing more to be recaptured in collection portion 146. This arrangement also allows for reduction or elimination of sealing within service line gap 150.

Bearing compartment 61 (shown in FIG. 2) can be secured around an aft end of bearing support element 60 via compartment mounting ring 74 and flange 102 disposed around an aft end of inner hub 46. In certain embodiments, such as in the example shown in FIG. 5, service line 134 can optionally include a threaded or other interface 152 for insertion into bearing compartment 61 (omitted for clarity).

In certain embodiments, service line port 132 and scupper drain port 130 are axially spaced apart at BDC position 148. To further improve liquid capture and retention, scupper channel system 140 can also comprise transport trench 154 in fluid communication with collection portion 146 and scupper drain port 130. Trench 154 allows for separation of service line port 132 and scupper drain port 130, which in turn allows more spacing between service line 130 and scupper line 136. In this way, most of the momentum of liquids can be dissipated in and around collection portion 146 and service line port 130, before they are sent on to scupper drain port 130 and out through scupper line 136.

Scupper channel system 130 was described with respect to generally cylindrical bearing support ring 64. In certain embodiments, scupper channel 130 can be incorporated into combination bearing support element 60, which includes bearing support ring 64 as well as frustoconical flow divider ring section 68. In certain embodiments, additional liquid, such as but not limited to, lubricant overspray drains onto and along flow divider inner surface 156. In embodiments where flow divider inner surface 156 is integral and contiguous with radially inner surface 142 of bearing support ring 64.

In certain alternative embodiments, bearing support ring 64 is a solitary, generally cylindrical element and does not include integral flow divider ring section 68. In these embodiments, a small amount of weeping oil will drain into lower parts of the engine, or will accumulate along an interface of a separate bearing support ring and flow divider ring.

It will also be recognized that scupper channel system is not limited to bearing support or TEC applications. Scupper channel system 140 can be adapted to any gas turbine engine component comprising a generally cylindrical section including a radially inner surface and a radially outer surface. Scupper drain port 130 can be formed through the generally cylindrical section of the component, and scupper channel system 140 can be formed into a portion of the radially inner surface of the component. The component can also include a generally frustoconical ring section contiguous with a forward end of the cylindrical section of the component so that the cylindrical and frustoconical sections form a single piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine module comprising:
a frame including a strut radially interconnecting an inner hub and an outer case, and a passage extending radially through the inner hub, the strut, and the outer case;
a bearing support ring mounted to the frame radially inward of the frame inner hub, the bearing support ring including a scupper drain port and a service line port disposed proximate to the scupper drain port;
a service line disposed radially through the radial passage of the frame and the service line port of the bearing support ring;
a scupper line disposed radially through the radial passage of the frame and open to the scupper drain port; and
a scupper channel system formed into a radially inner surface of the bearing support ring, the scupper channel system including a collection portion in fluid communication with the scupper drain port.

2. The gas turbine module of claim 1, further comprising a bearing compartment secured to a bearing compartment mounting flange, wherein the service line also extends into the bearing compartment.

3. The gas turbine module of claim 2, wherein the bearing compartment is supported around an aft end of the frame inner hub via the bearing support ring.

4. The gas turbine module of claim 1, wherein the scupper line, and the scupper drain port are located proximate a bottom dead center (BDC) position of the bearing support ring.

5. The gas turbine engine module of claim 1, wherein the collection portion is formed proximate the service line port.

6. The gas turbine engine module of claim 5, wherein the collection portion is formed concentrically around the service line port.

7. The gas turbine engine module of claim 1, wherein the scupper channel system also includes a separate transport trench in fluid communication with the collection portion and the scupper drain port.

8. The gas turbine engine module of claim 1, wherein the bearing support ring comprises a bearing support ring section and a flow divider ring section.

9. A turbine exhaust case (TEC) assembly comprising:
a frame including a circumferentially distributed plurality of struts each extending radially between an inner hub, and an outer case;
a passage formed radially through one of the plurality of struts;
a bearing support ring mounted to the frame inner hub, the bearing support ring including a scupper drain port circumferentially aligned with the passage; and
a scupper channel system formed into a radially inner surface of the bearing support ring, the scupper channel system including a liquid collection portion in fluid communication with the scupper drain port.

10. The TEC assembly of claim 9, further comprising:
a scupper line disposed radially through the radial passage of the frame and open to the scupper drain port.

11. The TEC assembly of claim 9, further comprising:
a service line port disposed radially through the bearing support ring, wherein the scupper line, and the scupper drain port are located proximate a bottom dead center (BDC) position of the bearing support ring.

12. The TEC assembly of claim 9, wherein the collection portion is formed proximate the service line port.

13. The TEC assembly of claim 12, wherein the collection portion is formed concentrically around the service line port.

14. The TEC assembly of claim 9, wherein the scupper channel system also includes a separate transport trench in fluid communication with the collection portion and the scupper drain port.

15. The TEC assembly of claim 9, wherein the bearing support ring comprises a bearing support ring section and a flow divider ring section.

16. A gas turbine engine component comprising:
a generally cylindrical section including a radially inner surface and a radially outer surface;
a generally frustoconical ring section contiguous with a forward end of the cylindrical section, the frustoconical ring section and the cylindrical ring section being a single piece;
a scupper drain port formed through the generally cylindrical section of the component; and
a scupper channel system formed into a portion of the radially inner surface of the component, the scupper channel system including a collection portion in fluid communication with the scupper drain port.

17. The gas turbine engine component of claim 16, wherein the scupper drain port is located proximate a bottom dead center (BDC) position of the cylindrical section.

18. The gas turbine engine component of claim 16, further comprising a service line port, wherein the scupper collection portion is disposed proximate the service line port.

19. The gas turbine engine component of claim 18, wherein the collection portion is formed concentrically around the service line port.

20. The gas turbine engine component of claim 18, wherein the scupper channel system further comprises a separate transport trench in fluid communication with the collection portion and the scupper drain port.

21. The gas turbine engine component of claim 16, wherein the gas turbine engine component comprises a bearing support ring.

* * * * *